Patented Mar. 1, 1938

2,109,833

UNITED STATES PATENT OFFICE 2,109,833

NEW COMPOUNDS OF THE BENZOFLUOR-ANTHENE SERIES

Werner Zerweck and Karl Schütz, Frankfort-on-the-Main-Fechenheim, Germany, assignors to General Aniline Works, Inc., New York, N. Y., a corporation of Delaware No Drawing. Application June 24, 1936, Serial No. 87,012. In Germany June 29, 1935

3 Claims. (Cl. 260—168)

Our present invention relates to new compounds of the benzofluoranthene series, more particularly to those of the general formula:

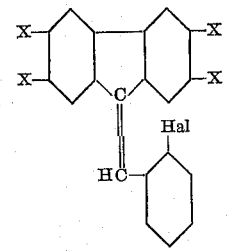

wherein one pair of X's on adjoining carbon atoms stands for a member selected from the group consisting of two hydrogen atoms and a radicle of the formula: —CH=CH—CH=CH—, and the other pair of X's stands for two hydrogen atoms.

The new compounds are obtained by splitting off hydrogen halide from a compound of the general formula:

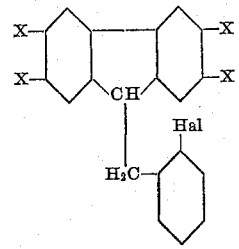

wherein the X's have the above said signification, or by splitting off hydrogen halide and two hydrogen atoms from a compound of the general formula:

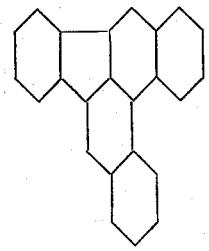

wherein the X's have the above said signification.

The new compounds may be used as intermediates for the production of dyestuffs.

In order to further illustrate our invention the following examples are given, the parts being by weight and all temperatures in degrees centigrade. However, we wish it to be understood that our invention is not limited to the particular products nor reaction conditions mentioned therein.

Example 1

21.6 parts of 9-(o-chlorobenzal)-fluorene of 70° melting point, obtained by condensing fluorene with o-chlorobenzaldehyde, are mixed with 108 parts of caustic potash and about 140 parts of quinoline and the mixture is heated to boiling for about 2 to 3 hours in an apparatus provided with a reflux condenser and a stirrer. Then the mass is poured on ice and hydrochloric acid, the precipitate formed is filtered off and recrystallized if necessary with addition of animal charcoal from glacial acetic acid or benzine. The new compound of the formula:

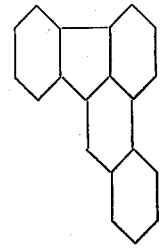

forms colorless needles of 167° melting point.

Instead of the quinoline there may be employed other high-boiling bases such as for example dimethylaniline, dimethyltoluidine etc.

The same new product is obtained by starting from 9-(o-chlorobenzyl)-fluorene of 77° melting point, prepared by condensing fluorene with o-chloro-benzyl-alcohol.

Example 2

By treating 9-(o-chlorobenzal)-2.3-benzofluorene (which is prepared by condensing 2.3-benzofluorene with o-chlorobenzaldehyde) as described in Example 1, a new hydrocarbon compound of the general formula:

or is obtained, which crystallizes in colorless needles of 230–231° melting point.

We claim:
1. Compounds of the benzofluoranthene series of the general formula:

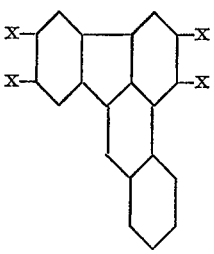

wherein one

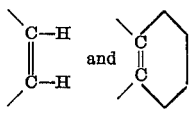

is a member of the class of

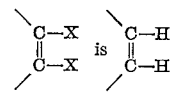 and and the other is which new benzofluoranthene compounds may be used as intermediates for the production of dyestuffs.

2. The 3.4-benzofluoranthene of the formula:

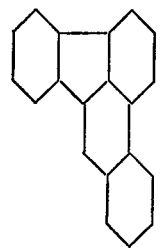

which crystallizes in colorless needles of 167° melting point and may be used as intermediates for the production of dyestuffs.

3. A dibenzofluoranthene obtainable by treating 9-(o-chlorobenzal)-2.3-benzofluorene of the formula:

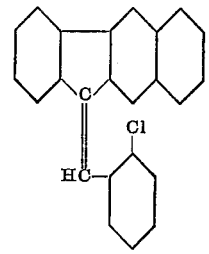

with agents suitable for splitting off hydrogen halide, which dibenzofluoranthene crystallizes in colorless needles of 230–231° C. melting point and may be used as intermediate for the production of new dyestuffs.

WERNER ZERWECK.
KARL SCHÜTZ.